(12) United States Patent
Mochizuki et al.

(10) Patent No.: US 12,535,713 B2
(45) Date of Patent: Jan. 27, 2026

(54) OPTICAL SEMICONDUCTOR DEVICE AND OPTICAL CONTROL APPARATUS

(71) Applicant: Mitsubishi Electric Corporation, Tokyo (JP)

(72) Inventors: Keita Mochizuki, Tokyo (JP); Takashi Nagira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 380 days.

(21) Appl. No.: 18/007,460

(22) PCT Filed: Nov. 19, 2020

(86) PCT No.: PCT/JP2020/043251
§ 371 (c)(1),
(2) Date: Jan. 30, 2023

(87) PCT Pub. No.: WO2022/107289
PCT Pub. Date: May 27, 2022

(65) Prior Publication Data
US 2023/0305355 A1    Sep. 28, 2023

(51) Int. Cl.
*G02F 1/21*    (2006.01)
*G02F 1/01*    (2006.01)

(52) U.S. Cl.
CPC ............ *G02F 1/212* (2021.01); *G02F 1/0121* (2013.01); *G02F 1/0136* (2013.01);
(Continued)

(58) Field of Classification Search
CPC ...... G02F 1/212; G02F 1/0121; G02F 1/0136; G02F 2201/18; G02F 2203/15; G02F 2203/50; G02F 2203/70
See application file for complete search history.

(56) References Cited

U.S. PATENT DOCUMENTS

| | | | | |
|---|---|---|---|---|
| 2010/0232803 A1* | 9/2010 | Ji | ................. | H04B 10/677 398/149 |
| 2019/0317341 A1* | 10/2019 | Nishikawa | .............. | G02F 1/017 |
| 2019/0348810 A1* | 11/2019 | Otsubo | .................... | H01S 5/125 |

FOREIGN PATENT DOCUMENTS

WO    2018/131227 A1    7/2018

OTHER PUBLICATIONS

International Search Report issued in PCT/JP2020/043251; mailed Feb. 2, 2021.
(Continued)

*Primary Examiner* — Michael A Faragalla
(74) *Attorney, Agent, or Firm* — Studebaker Brackett PLLC

(57) ABSTRACT

An optical semiconductor device includes an optical modulator provided on a substrate, an optical waveguide provided on the substrate, one end of the optical waveguide being connected to a light emission side of the optical modulator and another end of the optical waveguide being present at an end portion of the substrate, a phase adjusting unit provided on a path of the optical waveguide and an optical amplification unit provided on the path of the optical waveguide, wherein a minimum value or a maximum value of a transmittance spectrum having a ripple that periodically fluctuates with respect to a frequency because of multiple reflection of light that occurs between the one end and the other end of the optical waveguide is matched with a wavelength of the light input to the optical modulator by phase adjustment of the phase adjusting unit, and an error vector amplitude is minimized.

17 Claims, 14 Drawing Sheets

(52) U.S. Cl.
CPC .... *G02F 2201/18* (2013.01); *G02F 2201/305* (2013.01); *G02F 2203/15* (2013.01); *G02F 2203/50* (2013.01); *G02F 2203/70* (2013.01)

(56) References Cited

OTHER PUBLICATIONS

Fukiko Hirose et al. "Compact InP MZM Optical Sub-Assembly with Built-in Electrical Filters by Three-Dimensional Packaging Technique" WD2-3, Proc. OECC2019, Jul. 10, 2019.
Keita Mochizuki et al. "Optical Active Devices for Data Center Interconnects" BCI-1-4, IEICE 2019 Society Conference, 2019.

\* cited by examiner

OPTICAL SEMICONDUCTOR DEVICE AND OPTICAL CONTROL APPARATUS

FIELD

The present disclosure relates to an optical semiconductor device and an optical control apparatus.

BACKGROUND

In optical communication, in order to generate an optical modulation signal, a direct modulation scheme for controlling a current amount injected into a laser diode to carry a signal on the magnitude of light emission power, an external modulation scheme for positioning, on the outside, an EA (Electro-Absorption) modulator that absorbs light according to an applied voltage or an MZ (Mach-Zehnder) modulator that changes a phase according to an applied voltage and extinguishes light with interference and causing the modulator to absorb continuous light emitted from the laser diode to carry a signal on light emission power or a phase of light, or the like has been used. These modulators used in the external modulation scheme have often been integrated with the laser diode, which is a light source, according to maturation of semiconductor integration techniques in recent years. In order to increase emission light power, a structure of an optical semiconductor device for integrating an optical amplification unit such as an SOA (Semiconductor Optical Amplifier) with a modulator has also been proposed.

However, in general, it is difficult to completely match, on an interface surface among these different functions, a mode of an optical waveguide through which light passes. Reflection of the light occurs more or less. On an emission end face of the optical semiconductor device, in order to prevent light from reflecting on an interface and returning to the inside, in general, a structure for forming an AR (Anti-Reflection) coat on the light emission end face of the optical semiconductor device or obliquely forming an optical waveguide with respect to an end face is provided. However, like the interface surface among the different functions, it is difficult to completely prevent reflection of light. When a plurality of reflection points are present, light is multiply reflected among the reflection points such as Fabry-Perot etalon and a transmittance spectrum of the light has a characteristic of periodically fluctuating with respect to a frequency of the light. Since a spectrum of modulated light has width corresponding to modulation speed, a modulated light spectrum after being transmitted through the plurality of reflection points is distorted. As a result, the quality of a modulation signal is deteriorated.

Usually, reflectance of such light is suppressed extremely low. Therefore, an influence so great as to deteriorate a modulation characteristic of the optical semiconductor device does not occur. However, when the SOA is formed among the plurality of reflection interfaces, reflected return light is also amplified. As a result, a characteristic deterioration in a non-negligible degree occurs.

As a technique for solving the problems described above, a technique for, in an MZ-type semiconductor modulator in which the SOA is integrated, forming a slope on an interface between a passive waveguide and a light amplification region to suppress reflected return light into the light amplification region is disclosed (PTL 1). In this method, by forming the slope on the interface, it is possible to prevent reflected light generated on the interface from combining with an optical waveguide. As a result, it is possible to reduce reflected return light into the light amplification region.

CITATION LIST

Patent Literature

[PTL 1] WO2018/131227

SUMMARY

Technical Problem

In PTL 1, a structure for suppressing reflected return light in the light amplification region by reflection due to the interface between the waveguide and the light amplification region is disclosed. However, reflection from other reflection points, for example, an optical multiplexing unit formed in an exit portion of the MZ-type semiconductor modulator is not considered. When manufacturing variation and the like are also considered, it is difficult to completely suppress reflected return light on an inclined interface. In particular, when a light modulation gain of the SOA is large, even if slight reflection remains, the transmittance spectrum greatly fluctuates.

The present disclosure has been made in order to solve the problems described above and an object of the present disclosure is to provide an optical semiconductor device and an optical control apparatus that suppress an adverse effect on a spectrum and a time waveform of signal light even if reflected return light from a reflection point in the device to a light amplification region cannot be completely suppressed.

Solution to Problem

An optical semiconductor device according to the disclosure of the present application includes a substrate, an optical modulator provided on the substrate, an optical waveguide provided on the substrate, one end of the optical waveguide being connected to a light emission side of the optical modulator and another end of the optical waveguide being present at an end portion of the substrate, a phase adjusting unit provided on a path of the optical waveguide and configured to adjust a phase of light guided in the optical waveguide and an optical amplification unit provided on the path of the optical waveguide and configured to amplify power of the light guided in the optical waveguide, wherein a minimum value or a maximum value of a transmittance spectrum having a ripple that periodically fluctuates with respect to a frequency because of multiple reflection of the light that occurs between the one end and the other end of the optical waveguide is matched with a wavelength of the light input to the optical modulator by phase adjustment of the phase adjusting unit, and an error vector amplitude is minimized.

Other features of the present disclosure will be disclosed below.

Advantageous Effects of Invention

According to the present disclosure, the minimum value or the maximum value of the transmittance spectrum having the ripple that periodically fluctuates with respect to the frequency because of the multiple reflection of the light that occurs between one end and the other end of the optical waveguide is matched with the wavelength of the light input to the optical modulator by the phase adjustment of the phase adjusting unit. Therefore, it is possible to suppress an adverse effect on a spectrum and a time waveform of signal light.

DESCRIPTION OF EMBODIMENTS

Figure 1:
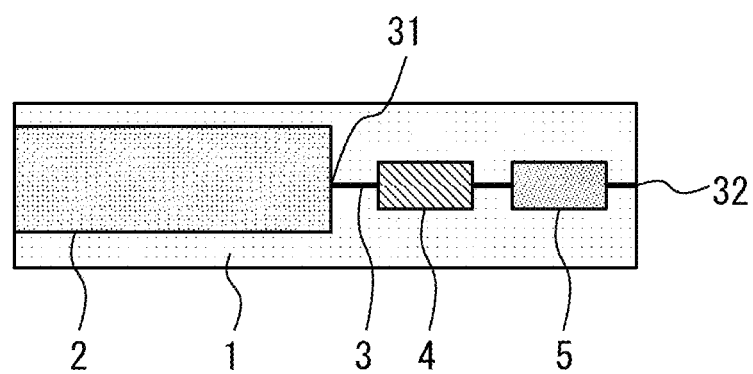
FIG. 1 is a diagram showing a configuration example of an optical semiconductor device.

The optical semiconductor devices and the optical control apparatuses according to the embodiments are described with reference to drawings. Identical or corresponding constitutional elements are given the same reference numerals, and the repeated description of such constitutional elements may be omitted.

First Embodiment

FIG. 1 is a plan view showing a configuration example of an optical semiconductor device 1 according to a first embodiment. Functional portions of the optical semiconductor device 1 are formed on one substrate. The optical semiconductor device 1 includes an optical modulator 2 provided on the substrate. The frequency response characteristic of the optical modulator 2 does not have a peak exceeding 3 dB across all frequencies compared with a DC component. An optical waveguide 3 provided on the substrate is connected to the optical modulator 2. One end of the optical waveguide 3 is connected to a light emission side of the optical modulator 2 and the other end is present at an end portion of the substrate. An interface between the optical modulator 2 and the optical waveguide 3 is a first interface 31. An interface between the end portion of the substrate and the optical waveguide 3 is a second interface 32. The second interface 32 can be considered an interface between an end portion of the optical semiconductor device 1 and the optical waveguide 3. The second interface 32 is a port from which light guided in the optical waveguide 3 is emitted to the outside of the optical semiconductor device 1. Light emitted from the optical modulator 2 is guided by the optical waveguide 3 and emitted to the outside.

A phase adjusting unit 4 that adjusts a phase of light guided in the optical waveguide 3 and an optical amplification unit 5 that amplifies power of the light guided in the optical waveguide 3 are provided on a path of the optical waveguide 3. In other words, the phase adjusting unit 4 and the optical amplification unit 5 are provided on the optical waveguide 3 between the first interface 31 and the second interface 32. The phase adjusting unit 4 can adjust the phase of the guided light with an injection current, an applied voltage, heat, or the like. The optical amplification unit 5 can amplify the power of the guided light with the injection current.

A transmittance spectrum having a ripple that periodically fluctuates with respect to a frequency of light because of multiple reflection that occurs between the first interface 31 and the second interface 32 is generated. In other words, a transmittance spectrum having a ripple that periodically fluctuates with respect to a frequency because of multiple reflection of light that occurs between one end and the other end of the optical waveguide 3 is generated. In the first embodiment, a minimum value of the transmittance spectrum and the wavelength of light input to the optical modulator are matched by phase adjustment of the phase adjusting unit 4.

When there are two light reflection points, the transmittance spectrum has a periodical ripple same as the Fabry-Perot etalon because of the multiple reflection. Since modulated light has fixed spectrum width corresponding to modulation speed, when the modulated light is transmitted through this optical filter, a spectrum is distorted and a signal characteristic can be affected. However, by configuring and phase-adjusting the optical semiconductor device 1 as explained above, it is possible to improve signal quality of the modulated light after being transmitted through a plurality of reflection points.

Figure 2:
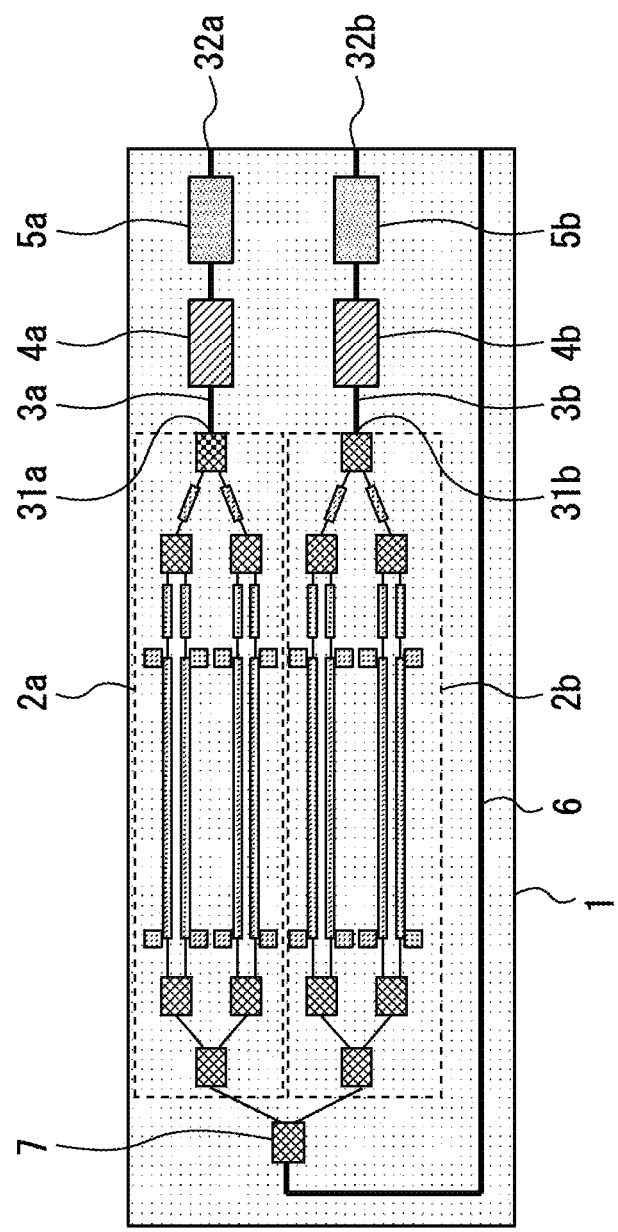
FIG. 2 is a diagram showing a configuration example of an optical semiconductor device.

In the following explanation, effects of the structure and the adjusting method explained above are explained. FIG. 2 is a diagram showing the structure of an optical semiconductor device used for a study. The optical semiconductor device 1 includes an indium phosphor material-based substrate. As the optical modulator 2, an MZ modulator having a nested structure suitable for multi-value intensity phase modulation of polarization multiplexing is adopted. The optical semiconductor device 1 includes an input waveguide 6 for light and a light dividing unit 7 that performs power division for dividing light input from the input waveguide 6 into two. The light dividing unit 7 is configured by, for example, a Y division waveguide or an MMI (Multi Mode Interference).

The light divided by the light dividing unit 7 is input to the optical modulators 2a and 2b, which are nested MZ modulators that perform the multi-value intensity phase modulation. Optical waveguides 3a and 3b are connected to outputs of the optical modulators 2a and 2b, respectively. A phase adjusting unit 4a and an optical amplification unit 5a are provided on a path of the optical waveguide 3a. A phase adjusting unit 4b and an optical amplification unit 5b are provided on a path of the optical waveguide 3b. These elements have the same functions as the functions of the corresponding elements shown in FIG. 1. The phase adjusting units 4a and 4b each independently perform phase adjustment in the same manner as shown in FIG. 1. The phase adjustment can be considered adjustment of a phase adjustment amount.

Figure 3:
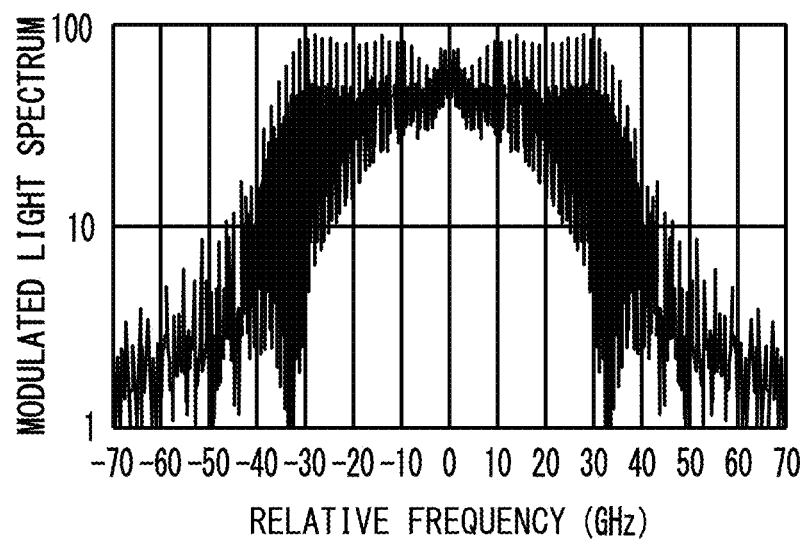
FIG. 3 is a diagram showing an example of a spectrum of modulated light.

FIG. 3 shows an example of a spectrum of modulated light at the time when 16-QAM (Quadrature Amplitude Modulation) at 65.7 Gbaud is performed using the optical modulators 2a and 2b in FIG. 2. Here, a characteristic of the following document is assumed as a frequency response characteristic of the optical modulators 2a and 2b.

F. Hirose et al, "Compact InP MZM Optical Sub-Assembly with Built-in Electrical Filters by Three-Dimensional Packaging Technique," WD2-3, Proc. OECC2019, 2019.

It is seen from FIG. 3 that a modulated light spectrum has a fixed width according to modulation speed or a frequency response band of a modulator. In particular, in the case of phase modulation such as QAM, a bright line of the wavelength of light input to the optical modulator 2 equivalent to a relative frequency 0 GHz in the figure disappears and the modulated light spectrum changes to a broad spectrum.

Figure 4:
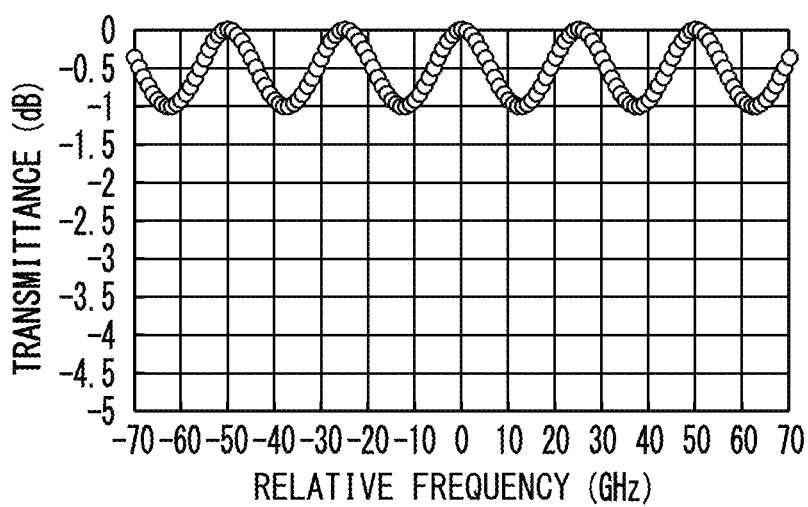
FIG. 4 is a diagram showing an example of a transmittance spectrum.
Figure 5:
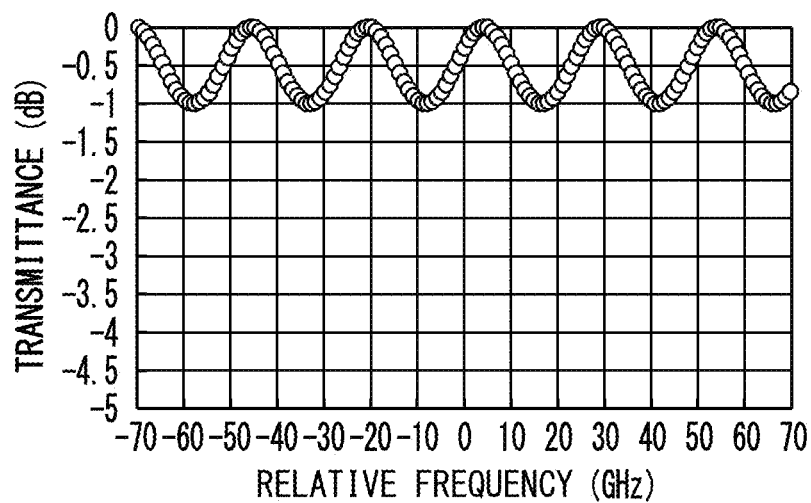
FIG. 5 is a diagram showing an example of a transmittance spectrum.
Figure 6:
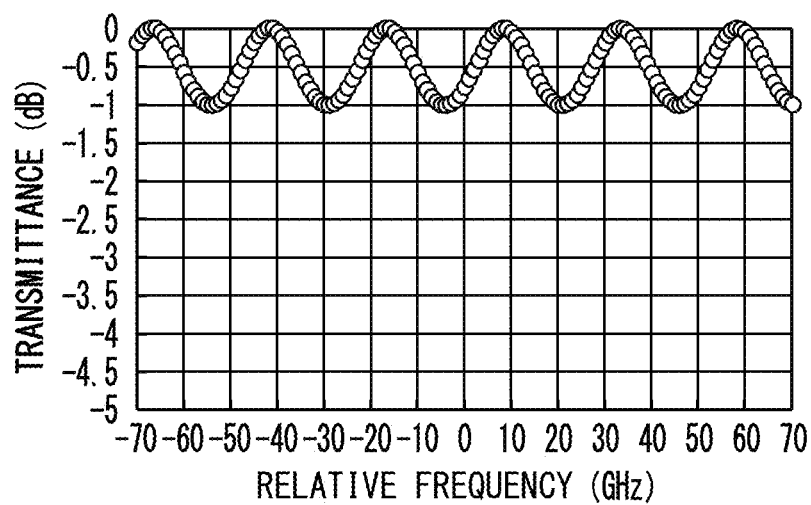
FIG. 6 is a diagram showing an example of a transmittance spectrum.
Figure 7:
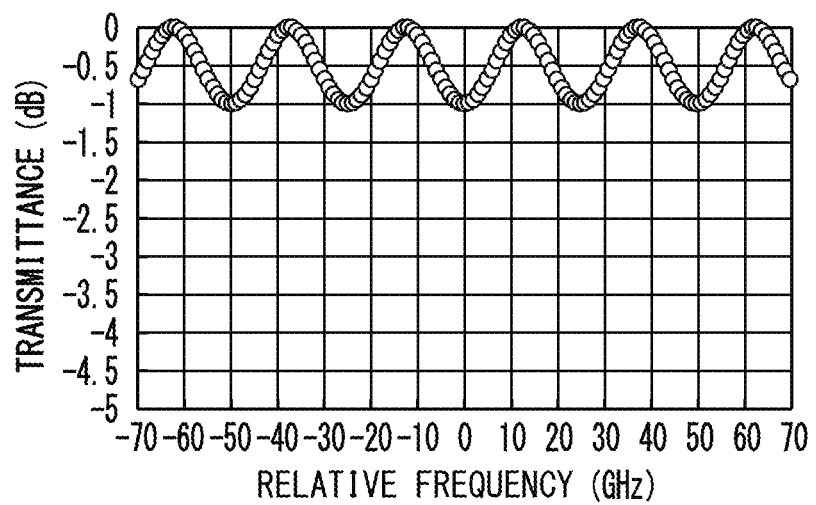
FIG. 7 is a diagram showing an example of a transmittance spectrum.
Figure 8:
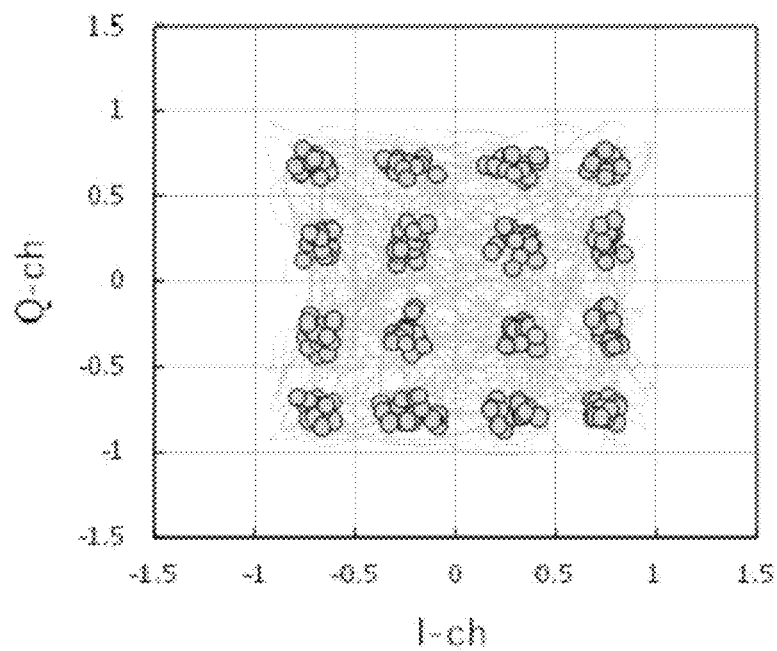
FIG. 8 is showing a calculation result of a constellation of modulated light.
Figure 9:
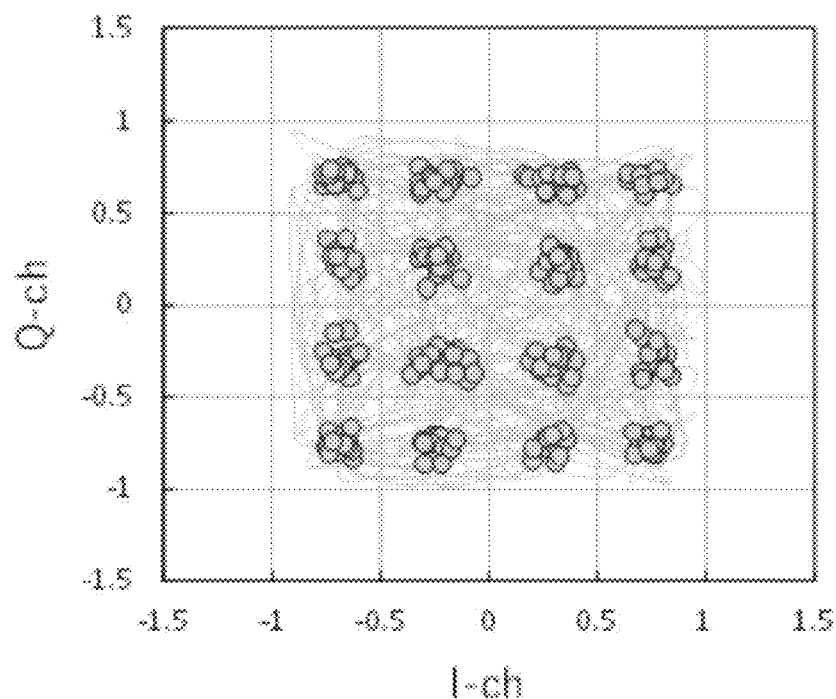
FIG. 9 is showing a calculation result of a constellation of modulated light.
Figure 10:
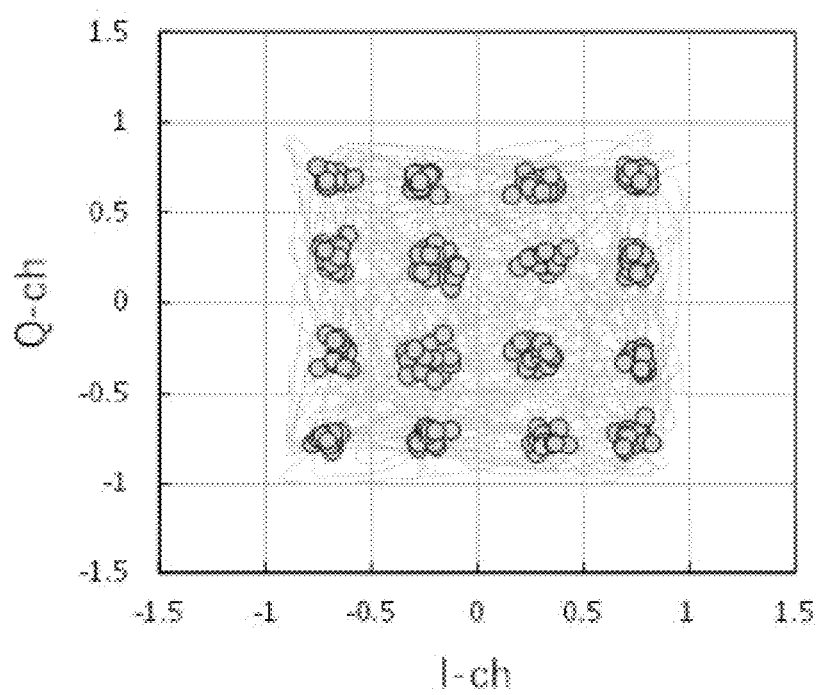
FIG. 10 is showing a calculation result of a constellation of modulated light.
Figure 11:
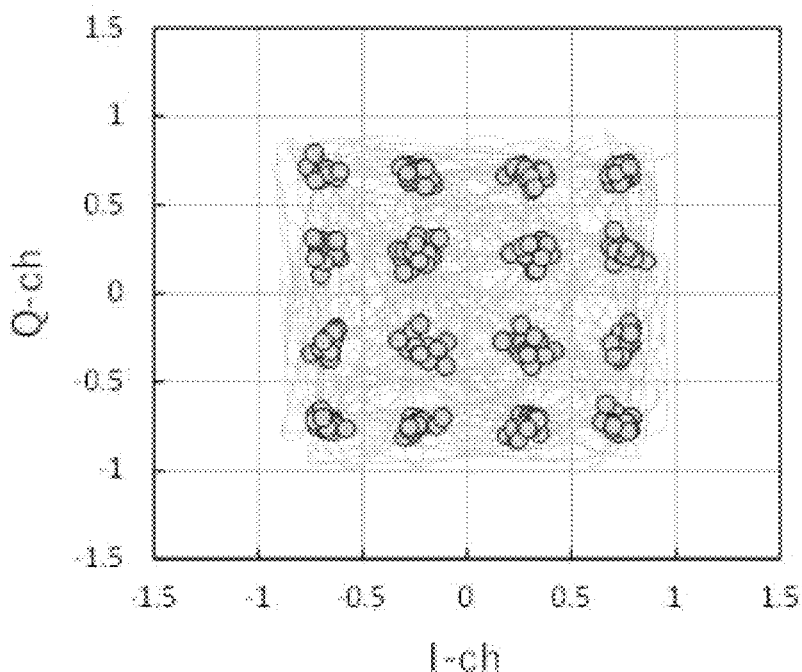
FIG. 11 is showing a calculation result of a constellation of modulated light.

FIG. 4 to FIG. 7 are diagrams showing examples of transmittance spectra by multiple reflection. The spectra are obtained under conditions in which a distance between the interface 31 and the interface 32 is 1.82 mm, an effective refractive index of the optical waveguide 3 is 3.3, each of the light reflectances of the interface 31 and the interface 32 is equivalent to 5.75%, an FSR (Free Spectral Range: a resonance frequency interval) is approximately 25 GHz, and amplitude of a ripple is approximately 1 dB. Actually, light reflectance is sufficiently smaller than this. Instead, a light amplification effect by the SOA is added. However, note that the light reflectances of the interface 31 and the interface 32 are effective values obtained by including the effects of the SOA in the reflectances. FIG. 4 to FIG. 7 also represent changes at the time when an adjustment amount of the phase adjusting unit 4 is changed. By changing the phase adjustment amount of the phase adjusting unit 4, it is possible to shift the transmittance spectrum in a frequency direction. A case in which the wavelength of the light input to the optical modulator 2, that is, the relative frequency 0 GHz coincides with a maximum value of a ripple of the transmittance spectrum is defined as 0 degrees and a case in which the relative frequency 0 GHz coincides with a minimum value of the ripple is defined as 180 degrees, FIG. 4 is the transmittance spectrum shifted 0 degrees, FIG. 5 is the transmittance spectrum shifted 60 degrees, FIG. 6 is the transmittance spectrum shifted 120 degrees, and FIG. 7 is the transmittance spectrum shifted 180 degrees.

In FIG. 8 to FIG. 11, calculation results of constellations of modulated light emitted from the optical semiconductor device 1 at the time when the phase adjustment amount of the phase adjusting unit 4 is changed. Circles shown in the figures indicate complex amplitudes of the modulated light at symbol determination times. Light color lines in the figures indicates a track of transition of the complex amplitude of the modulated light. The phase adjustment amount is 0 degrees in FIG. 8, 60 degrees in FIG. 9, 120 degrees in FIG. 10, and 180 degrees in FIG. 11.

Figure 12:
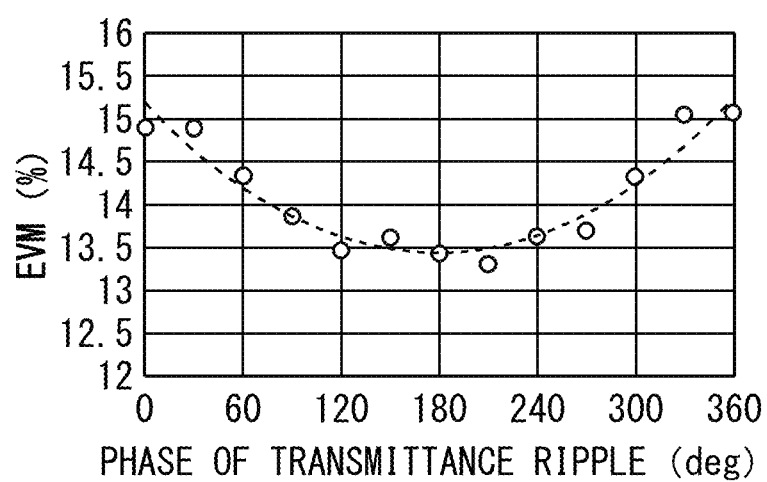
FIG. 12 is showing calculation results of EVM.

A result obtained by calculating, with respect to the phase adjustment amounts, from complex amplitudes in ideal symbol positions, modulation accuracy (Error Vector Magnitude, EVM) used in general as an indicator indicating differences of complex amplitudes of the modulated light in actual symbol determination times is shown in FIG. 12. In FIG. 12, circles indicate calculation results and a dotted line indicates an approximate curve.

From FIG. 12, when the phase adjustment amount is 180 degrees, that is, when the wavelength of the light input to the optical modulator 2 is adjusted to coincide with a minimum value of the ripple of the transmittance spectrum, the EVM is the smallest and the modulated light with good signal quality is obtained. That is, an error vector amplitude can be minimized. In the case of the conditions explained above, in the modulated light spectrum after being transmitted through the plurality of reflection points, a low-frequency component is suppressed from a DC and a high-frequency component is raised. Therefore, the same effects as the effects of equalizing are obtained.

As shown in FIG. 2, even in a configuration in which a plurality of unit structures each including the optical modulator, the optical waveguide, the phase adjusting unit, and the optical amplification unit are provided in parallel, the EVM can be reduced by independently phase-adjusting the phase adjusting unit belonging to each of the plurality of unit structures.

Note that, when a phase adjustment amount with which the EVM is the largest is 0 degrees, that is, the wavelength of the light input to the optical modulator 2 is adjusted to coincide with the maximum value of the ripple of the transmittance spectrum, since a high-frequency component is suppressed, the modulated light spectrum after being transmitted through the plurality of reflection points is the same phenomenon as deterioration of a modulation band.

Shapes, materials, and a positional relation of the optical semiconductor device 1, the optical modulator 2, the optical waveguide 3, the phase adjusting unit 4, and the optical amplification unit 5 are not limited to those explained above and various modifications are possible. For example, the positions of the phase adjusting unit 4 and the optical amplification unit 5 may be replaced with each other or the optical amplification unit 5 may be positioned to be in contact with an end face of the optical semiconductor device 1. In this case, there is an advantage that the size of the optical semiconductor device 1 can be reduced. The optical modulator 2 does not need to be the nested MZ modulator and may be either a stand-alone MZ modulator or an EA modulator. Not the input waveguide 6 that introduces input light but a laser diode itself functioning as a light source may be integrated in the optical semiconductor device 1.

In the following embodiments, differences from the first embodiment will be mainly described.

Second Embodiment

An optical semiconductor device according to a second embodiment is similar to the optical semiconductor device in the first embodiment. However, a frequency response characteristic of the optical modulator 2 in the second embodiment has a peak exceeding 3 dB in a high-frequency component, which is not 0 GHz, compared with a DC component. Further, in the second embodiment, a maximum value of a transmittance spectrum and the wavelength of light input to the optical modulator 2 are matched by phase adjustment of the phase adjusting unit 4. That is, a phase adjustment amount of the phase adjusting unit 4 is adjusted such that a maximum value of a transmittance spectrum having a ripple that periodically fluctuates with respect to a frequency of light because of multiple reflection of light between the interface 31 and the interface 32 coincides with the wavelength of the light input to the optical modulator 2.

In the first embodiment, an original frequency response characteristic of the optical modulators 2a and 2b has a shape not having a peak exceeding 3 dB across all frequencies compared with a DC component. Therefore, the phase adjustment amount of the phase adjusting unit 4 is adjusted such that the minimum value of the transmittance spectrum having the ripple that periodically fluctuates with respect to the frequency of the light coincides with the wavelength of the light input to the optical modulator 2. This is most effective in suppressing a low-frequency component and raising a high-frequency component from a DC.

However, for example, when peaking due to a relaxation oscillation frequency or an inductance component of a wire is large and the optical modulator 2 has a frequency response characteristic having a peak exceeding 3 dB in a high-frequency component, which is not 0 GHz, compared with a DC component, measures opposite to the measures in the first embodiment are necessary. That is, by adjusting the wavelength of the light input to the optical modulator 2 to coincide with the maximum value of the ripple of the transmittance spectrum, the high-frequency component can be suppressed in the modulated light spectrum after being transmitted through the plurality of reflection points. Therefore, it is possible to shape the light into modulated light having good signal quality.

In the second embodiment as well, as shown in FIG. 2, it is possible to adopt an optical semiconductor device of a type including a plurality of configurations each including the optical modulator and the subsequent components in parallel.

Third Embodiment

In an optical semiconductor device according to a third embodiment, as in the first embodiment, a frequency response characteristic of the optical modulator 2 does not have a peak exceeding 3 dB across all frequencies compared with a DC component. Further, a minimum value of a transmittance spectrum and the wavelength of light input to the optical modulator 2 are matched by phase adjustment of the phase adjusting unit 4.

In the third embodiment, a distance from one end to the other end of the optical waveguide 3, that is, a distance from the interface 31 to the interface 32 is set such that a resonance frequency interval (FSR) of the ripple of the transmittance spectrum explained above substantially coincides with 0.5 times to 1.25 times of a modulation baud rate of a communication signal input to the optical modulator. In other words, the length of the optical waveguide 3 is set such that a resonance frequency interval (FSR) of a ripple of a transmittance spectrum that periodically modulates with respect to a frequency of light substantially coincides with 0.5 times to 1.25 times of a modulation baud rate of the optical modulator 2.

Figure 13:
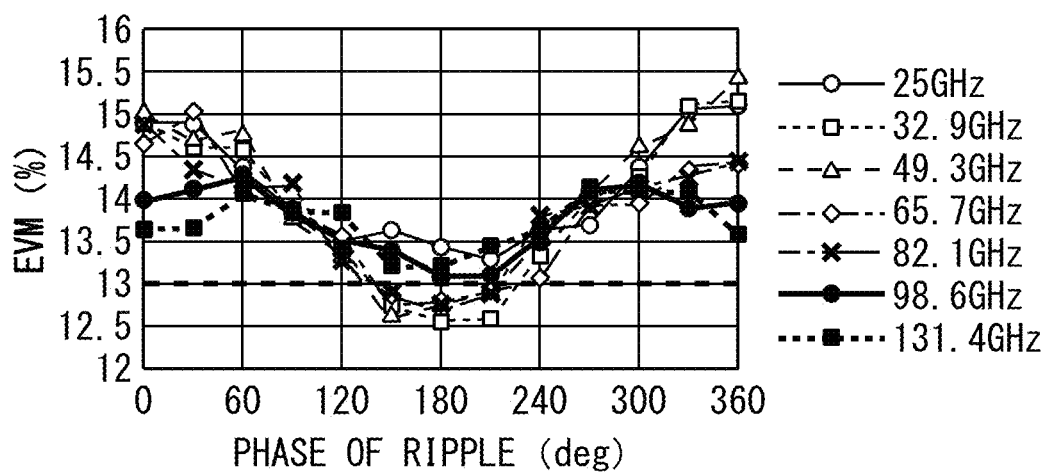
FIG. 13 is showing calculation results of EVM.

Effects by this embodiment are explained. FIG. 13 is a diagram showing a result of calculating an EVM from constellations of modulated light emitted from the optical semiconductor device 1 when the adjustment amount of the phase adjusting unit 4 is changed using the same method as the method in the first embodiment. In FIG. 13, the resonance frequency interval (FSR) of a ripple of a transmittance spectrum due to multiple reflection of light that occurs between the interface 31 and the interface 32 is set to 25 GHz, 32.9 GHz, 49.3 GHz, 65.7 GHz, 82.1 GHz, 98.6 GHz, and 131.4 GHz. As an example, when EVM<13% is set as a reference, it is seen that a signal quality improvement effect is large when the FSR is 32.9 GHz, 49.3 GHz, 65.7 GHz, and 82.1 GHz. This is because, in this embodiment, since an effect of emphasizing a frequency response characteristic near a fundamental frequency, which is a half of the baud rate, is obtained, fluctuation in complex amplitude at symbol determination timing is strongly suppressed.

Fourth Embodiment

An optical semiconductor device according to a fourth embodiment is similar to the optical semiconductor device in the third embodiment. However, a frequency response characteristic of the optical modulator 2 has a peak exceeding 3 dB in a frequency component substantially coinciding with 0.5 times to 1.25 times of a modulation baud rate of an input communication signal compared with a DC component. As in the third embodiment, a distance from one end to the other end of the optical waveguide 3 in the fourth embodiment is set such that a resonance frequency interval of a ripple of a transmittance spectrum substantially coincides with 0.5 times to 1.25 times of a modulation baud rate of a communication signal input to the optical modulator.

Further, a maximum value of a transmittance spectrum and the wavelength of light input to the optical modulator 2 are matched by phase adjustment of the phase adjusting unit 4.

In the third embodiment, an original frequency response characteristic of the optical modulators 2a and 2b has a shape not having a peak exceeding 3 dB across all frequencies compared with a DC component. This is most effective when a phase adjustment amount of the phase adjusting unit 4 is adjusted such that a minimum value of a transmittance spectrum having a ripple that periodically fluctuates with respect to a frequency of light coincides with the wavelength of light input to the optical modulator 2.

However, in some case, for example, peaking due to a relaxation oscillation frequency or an inductance component of a wire is large and the optical modulator 2 has a frequency response characteristic having a peak exceeding 3 dB in a frequency component substantially coinciding with 0.5 times to 1.25 times of a modulation baud rate compared with a DC component. In this case, contrary to the third embodiment, by performing phase adjustment such that the wavelength of light input to the optical modulator 2 coincides with a maximum value of a ripple of a transmittance spectrum, a high-frequency component can be suppressed in a modulated light spectrum after being transmitted through a plurality of reflection points. Therefore, it is possible to shape the light into modulated light having good signal quality.

Fifth Embodiment

Figure 14:
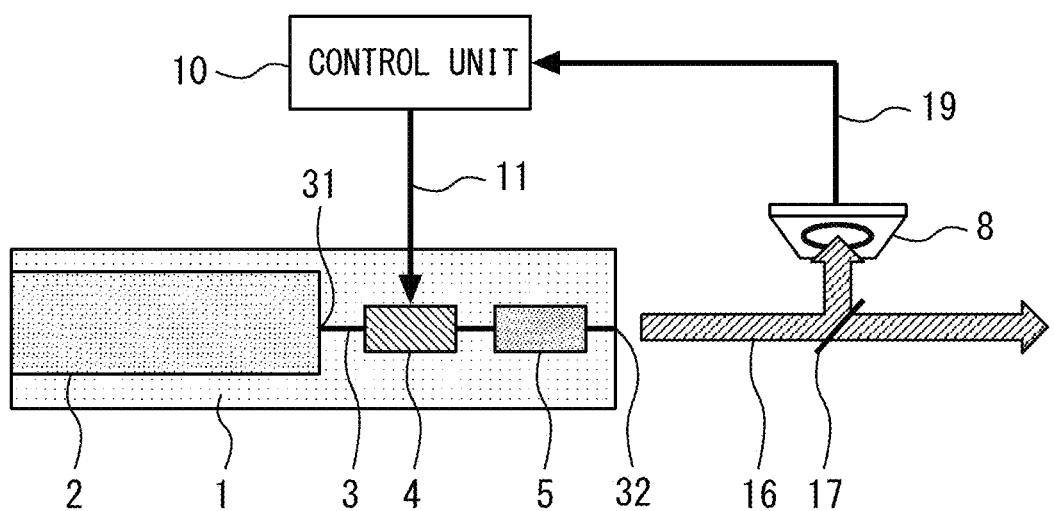
FIG. 14 is a diagram showing a configuration example of an optical control apparatus.

FIG. 14 is a diagram showing a configuration example of an optical control apparatus according to a fifth embodiment. The optical control apparatus according to the fifth embodiment is a modification of the first embodiment. A frequency response characteristic of the optical modulator 2 according to the fifth embodiment does not have a peak exceeding 3 dB across all frequencies compared with a DC component. A part of power of modulated light 16 emitted from the second interface 32 of the optical semiconductor device, which is the other end of the optical waveguide 3, is divided by a beam splitter 17. The light divided by the beam splitter 17 is converted into a light receiving current corresponding to optical power by a light receiving unit 8. The light receiving unit 8 is, for example, a semiconductor photodiode. The light receiving current is detected by a control unit 10. The control unit 10 detects the light receiving current and outputs a phase adjustment signal 11 toward the phase adjusting unit 4.

The control unit 10 applies, as the phase adjustment signal 11, in addition to a phase adjustment amount which is a DC component, a dither signal having amplitude of approximately 1/10 of the phase adjustment amount and having a low-speed frequency at which the light receiving unit 8 can respond and determines a value of the DC component of the phase adjustment signal 11 such that an AC component and a DC component of a light receiving current 19 are the smallest. Here, the dither signal is, for example, a rectangular wave shape AC component of approximately 1 kHz. In this way, the control unit 10 applies, in addition to the phase adjustment amount, which is the DC component, for example, a dither having sufficiently small amplitude of approximately 1/10 of the phase adjustment amount and having sufficiently low speed at which the light receiving unit 8 can respond and determines a value of the DC component of the phase adjustment signal 11 such that an AC component and a DC component of the light receiving current 19 generated by the light receiving unit 8 are the smallest.

Figure 15:
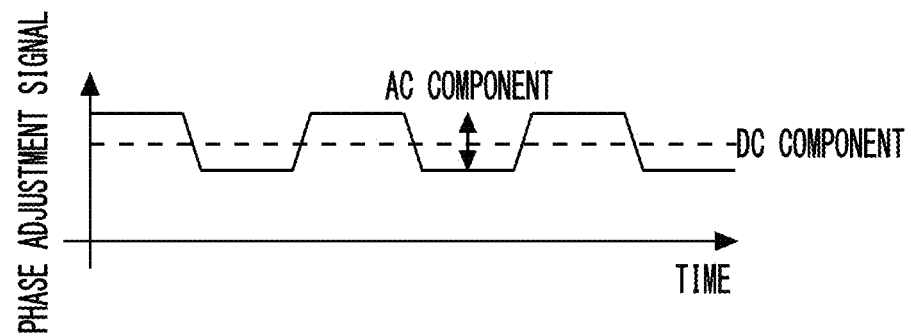
FIG. 15 is a graph showing an example of a time response waveform of a phase adjustment signal.
Figure 16:
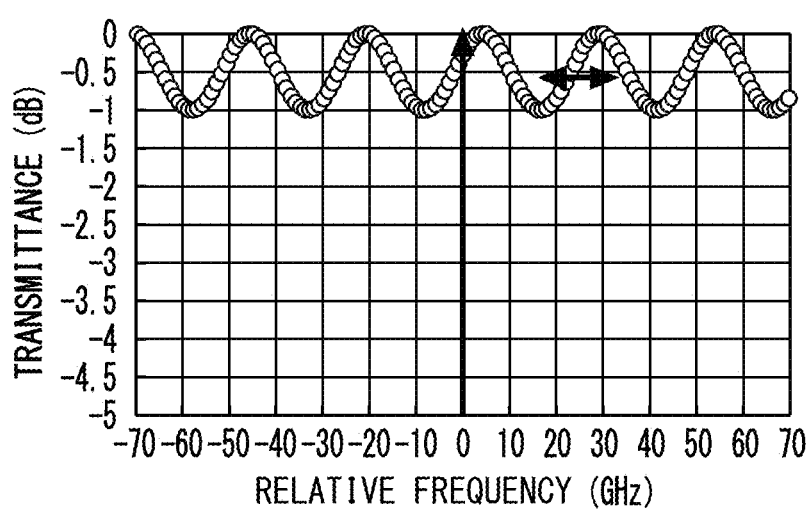
FIG. 16 is a diagram showing an example of a transmittance spectrum.

Effects by this embodiment are explained. FIG. 15 is a graph schematically showing a time response waveform of the phase adjustment signal 11. An AC component is superimposed on a DC component. At this time, as shown in FIG. 16, a transmittance spectrum varies with respect to a frequency according to the AC component and a transmittance spectrum with respect to light fluctuates. As a result, a time response waveform of the light receiving current 19 changes according to a phase relation between the light and the transmittance spectrum.

Figure 17:
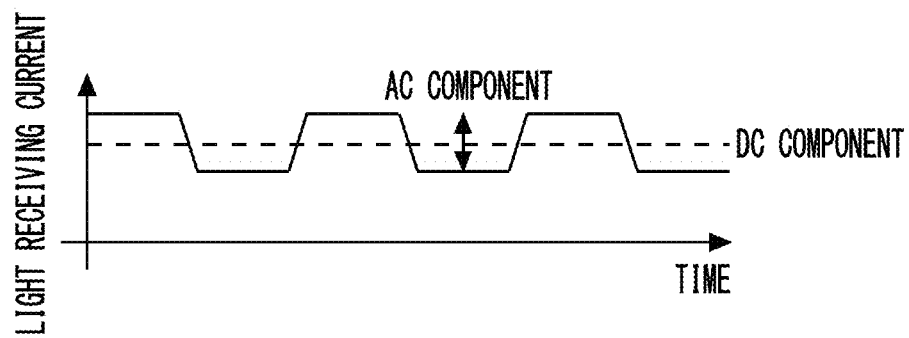
FIG. 17 is a graph showing an example of a time response waveform of a phase adjustment signal.
Figure 18:
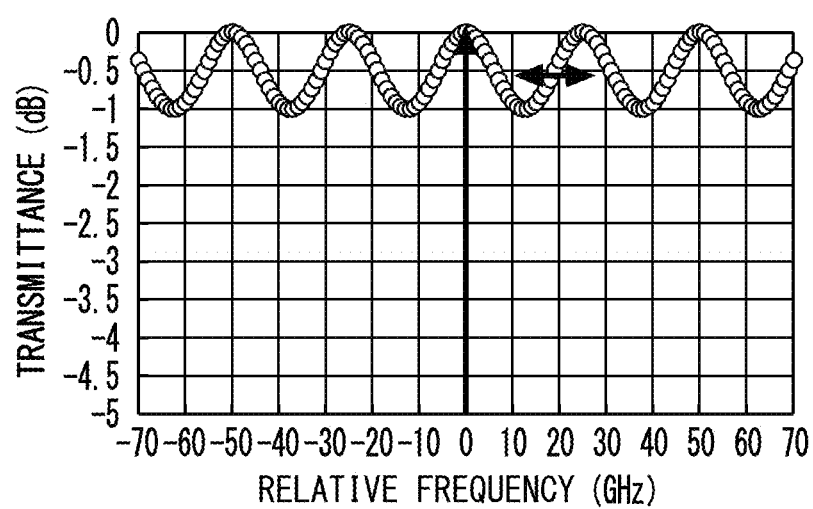
FIG. 18 is a diagram showing an example of a transmittance spectrum.
Figure 19:
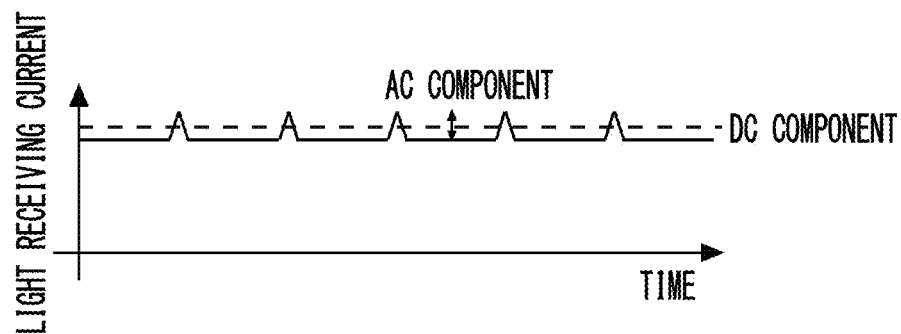
FIG. 19 is a graph showing an example of a time response waveform of a phase adjustment signal.

FIG. 17 is a case in which a phase adjustment point is present halfway in a ripple of the transmittance spectrum. The light receiving current 19 has a time waveform similar to the phase adjustment signal 11. FIGS. 18 and 19 show a phase relation between light and the transmittance spectrum and a time response waveform of the light receiving current 19 in the case in which the adjustment amount of the phase adjusting unit 4 is 0 degrees, that is, the wavelength of light input to the optical modulator 2 coincides with the maximum value of the ripple of the transmittance spectrum. In this case, transmittance varies centering on a maximum point of the ripple of the transmittance spectrum. Therefore, the amplitude of an AC component is smaller than a state shown in FIG. 17 and a DC component is the largest.

Figure 20:
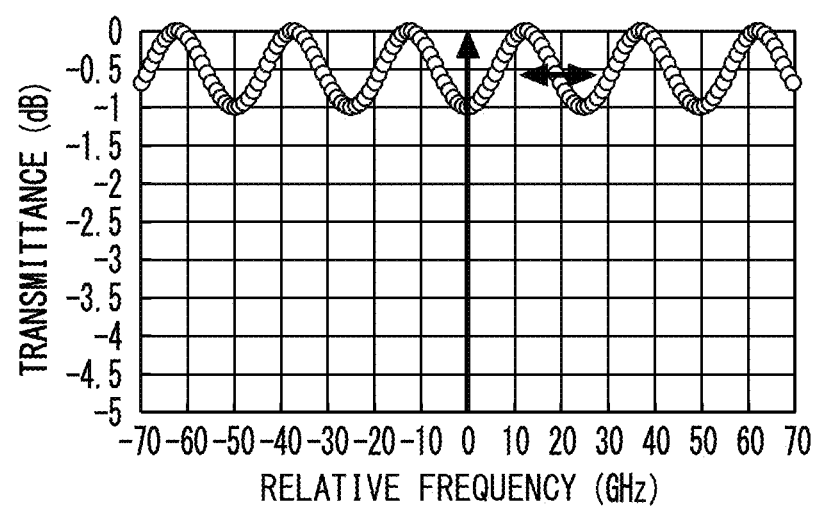
FIG. 20 is a diagram showing an example of a transmittance spectrum.
Figure 21:
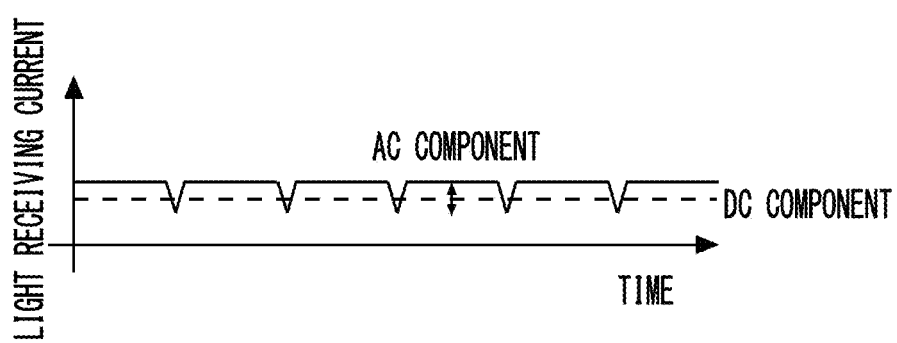
FIG. 21 is a graph showing an example of a time response waveform of a phase adjustment signal.

FIGS. 20 and 21 show a phase relation between light and a transmittance spectrum and a time response waveform of the light receiving current 19 in the case in which an adjustment amount of the phase adjusting unit 4 is 180 degrees, that is, the wavelength of light input to the optical modulator 2 coincides with a minimum value of a ripple of the transmittance spectrum. In this case, transmittance varies centering on a minimum point of the ripple of the transmittance spectrum. Therefore, the amplitude of an AC component is smaller than the state shown in FIG. 17 and is the same degree as FIG. 19 and a DC component is the smallest.

Consequently, by determining a value of the DC component of the phase adjustment signal 11 such that the AC component and the DC component of the light receiving current 19 generated by the light receiving unit 8 are the smallest as in this embodiment, it is possible to automatically adjust the phase adjustment amount to a desired phase adjustment amount.

Sixth Embodiment

An optical control apparatus according to a sixth embodiment has the same configuration as the configuration of the optical control apparatus shown in FIG. 14. Therefore, the optical control apparatus according to the sixth embodiment includes the beam splitter 17 that divides a part of power of the modulated light 16 output from the other end of the optical waveguide 3 to the outside of the optical semiconductor device 1, the light receiving unit 8 that converts the light divided by the beam splitter 17 into a light receiving current corresponding to optical power, and the control unit 10 that detects the light receiving current 19 and outputs the phase adjustment signal 11 toward the phase adjusting unit 4.

The optical control apparatus according to the sixth embodiment is a modification of the second embodiment. A frequency response characteristic of the optical modulator 2 has a peak exceeding 3 dB in a high-frequency component, which is not 0 GHz, compared with a DC component. The control unit 10 applies, as the phase adjustment signal, in addition to a phase adjustment amount which is a DC component, a dither signal having amplitude of approximately 1/10 of the phase adjustment amount and having a low-speed frequency at which the light receiving unit 8 can respond and determines a value of the DC component of the phase adjustment signal such that an AC component of the light receiving current is the smallest and a DC component of the light receiving current is the largest. The dither signal is, for example, a rectangular wave shape AC component of approximately 1 kHz. In this way, the control unit 10 applies, in addition to the phase adjustment amount, which is the DC component, for example, a dither having sufficiently small amplitude of approximately 1/10 of the phase adjustment amount and having sufficiently low speed at which the light receiving unit 8 can respond and determines a DC component of the phase adjustment signal 11 such that an AC component of the light receiving current 19 generated by the light receiving unit 8 is the smallest and a DC component of the light receiving current 19 is the largest.

In the fifth embodiment, an original frequency response characteristic of the optical modulators 2a and 2b has a shape not having a peak exceeding 3 dB across all frequencies compared with a DC component. This is most effective when the phase adjustment amount of the phase adjusting unit 4 is adjusted such that a minimum value of a transmittance spectrum having a ripple that periodically fluctuates with respect to a frequency of light coincides with the wavelength of light input to the optical modulator 2.

However, for example, when peaking due to a relaxation oscillation frequency or an inductance component of a wire is large and the optical modulator 2 has a frequency response characteristic having a peak exceeding 3 dB in a high-frequency component, which is not 0 GHz, compared with a DC component, contrary to the fifth embodiment, by adjusting the wavelength of the light input to the optical modulator 2 to coincide with the maximum value of the ripple of the transmittance spectrum, the high-frequency component can be suppressed in the modulated light spectrum after being transmitted through the plurality of reflection points. This makes it possible to shape the light into modulated light having good signal quality.

As shown in FIGS. 18 and 19, when an adjustment amount of the phase adjusting unit 4 is 0 degrees, that is, the wavelength of light input to the optical modulator 2 coincides with a maximum value of a ripple of the transmittance spectrum, transmittance varies centering on a maximum point of the ripple of the transmittance spectrum. Therefore, the amplitude of an AC component is smaller than the state shown in FIG. 17 and a DC component is the largest. Consequently, by determining a value of the DC component of the phase adjustment signal 11 such that the AC component of the light receiving current 19 generated by the light receiving unit 8 is the smallest and the DC component of the light receiving current 19 is the largest as in this embodiment, it is possible to automatically adjust the phase adjustment amount to a desired phase adjustment amount.

Seventh Embodiment

Figure 22:
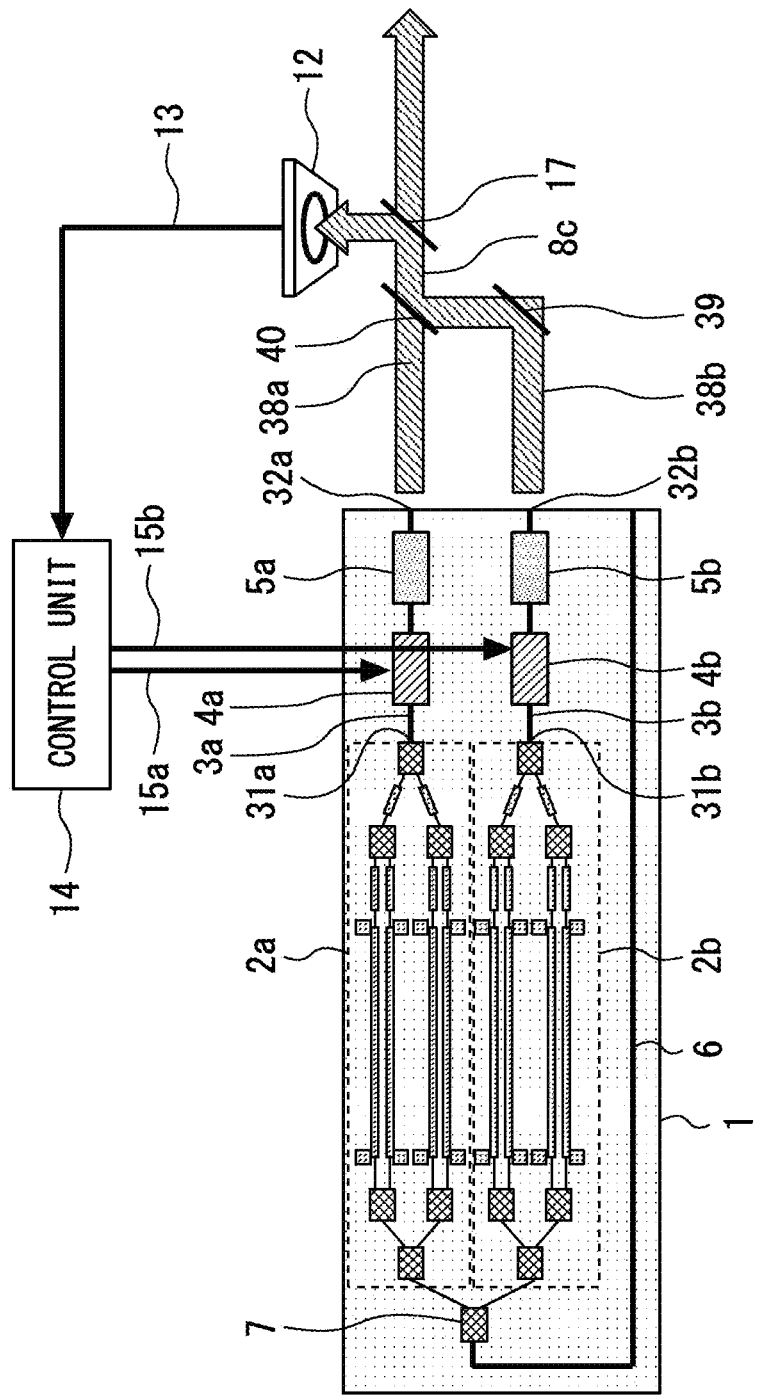
FIG. 22 is a diagram showing a configuration example of an optical control apparatus.

An optical control apparatus in a seventh embodiment is a modification of the fifth and sixth embodiments. FIG. 22 is a diagram showing a configuration example of the optical control apparatus according to the seventh embodiment. The optical control apparatus includes the light dividing unit 7 having a function of performing power division for equally dividing input light into two. The light dividing unit 7 is, for example, a Y-branch waveguide or an MMI.

A first unit structure including the optical modulator 2a, the optical waveguide 3a, the phase adjusting unit 4a, and the optical amplification unit 5a and a second unit structure including the optical modulator 2b, the optical waveguide 3b, the phase adjusting unit 4b, and the optical amplification unit 5b are provided. The first unit structure and the second unit structure are provided in parallel. According to an example, each of the optical modulators 2a and 2b is a nested MZ modulator that performs multi-value intensity phase modulation. The phase adjusting unit 4a and the optical amplification unit 5a are present between a first interface 31a and a second interface 32a. The phase adjusting unit 4b and the optical amplification unit 5b are present between a first interface 31b and a second interface 32b. The light dividing unit 7 equally divides power of light into two and makes one light incident on the optical modulator 2a of the first unit structure and makes the other light incident on the optical modulator 2b of the second unit structure.

A polarized wave rotation multiplexer that rotates a polarized wave of one of first modulated light 38a emitted from the first unit structure and second modulated light 38b emitted from the second unit structure, does not rotate a polarized wave of the other, and multiplexes the polarized waves is provided. As an example of the polarized wave rotation multiplexer, optical prism groups 39 and 40 are shown in FIG. 22. A polarized wave of one modulated light of a first modulated light 8a and a second modulated light 8b emitted from the second interfaces 32a and 32b is rotated and the first modulated light 38a and the second modulated light 38b are multiplexed.

A part of power of the modulated light polarization-multiplexed by the polarized wave rotation multiplexer is divided by the beam splitter 17. Specifically, a part of power of polarization-multiplexed modulated light 38c polarization-multiplexed by the optical prism groups 39 and 40 is divided by the beam splitter 17.

A light receiving unit 12 converts the light divided by the beam splitter 17 into a light receiving current corresponding to optical power. The light receiving unit 12 is, for example, a semiconductor photodiode. A control unit 14 detects a light receiving current 13 generated by the light receiving unit 12 and outputs phase adjustment signals 15a and 15b of the phase adjusting units 4a and 4b.

Two phase adjustment signals 15a and 15b are explained. The control unit 14 applies, as two phase adjustment signals 15a and 15b, in addition to phase adjustment amounts which are DC components, for example, dither signals having amplitude of approximately 1/10 of the phase adjustment amounts and having low-speed frequencies at which the light receiving unit can respond, the low-speed frequencies being different two frequencies separated to an electrically separable degree, and determines values of the DC components of the two phase adjustment signals such that AC components of different two frequencies of the light receiving current are the smallest and DC components of the two frequencies are the largest or the smallest. Here, "dither signals having different two frequencies separated to an electrically separable degree" are, for example, dithers that are rectangular wave shape AC components of approximately 1 kHz and approximately 100 kHz.

Here, when a frequency response characteristic of the optical modulator does not have a peak exceeding 3 dB across all frequencies compared with a DC component, the control unit 14 adjusts the DC component of the light receiving current to the smallest.

When the frequency response characteristic of the optical modulator has a peak exceeding 3 dB in a high-frequency component, which is not 0 GHz, compared with the DC component, the control unit 14 adjusts the DC component of the light receiving current to the largest.

As in this embodiment, by differentiating the frequencies of the dithers applied to the phase adjusting units 4a and 4b, an AC component of the light receiving current 13 after both of the modulated light 38a and the modulated light 38b are polarization-multiplexed can be frequency-separated by the control unit 14. As a result, it is possible to execute two different kinds of control simply by detecting one light. It is possible to realize a small and low-cost optical control apparatus. Note that a shape, a material, and a positional relation of the optical control apparatus do not need to be limited to this embodiment. For example, the optical prism groups 39 and 40, the beam splitter 17, the light receiving unit 12, and the like are formed by a space optical system in this embodiment. However, the optical prism groups 39 and 40, the beam splitter 17, the light receiving unit 12, and the like may be formed by a plane optical system having the same functions formed on a semiconductor material such as silicon or indium phosphor, may be formed by a glass material such as a PLC (Planer Lightwave Circuit), or may be a combination of them.

Eighth Embodiment

Figure 23:
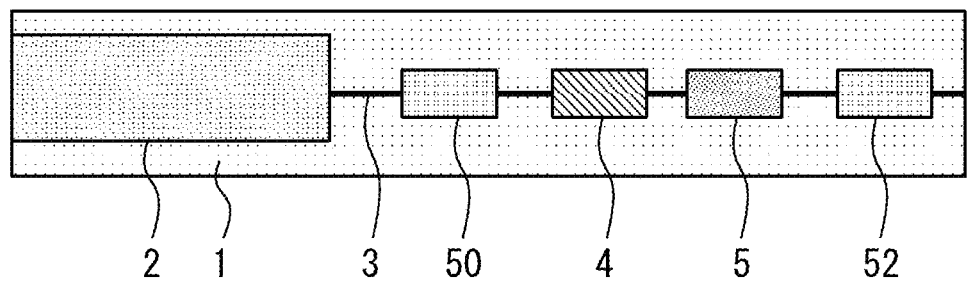
FIG. 23 is a diagram showing a configuration example of an optical semiconductor device.

FIG. 23 is a diagram showing a configuration example of an optical semiconductor device according to an eighth embodiment. The optical semiconductor device according to the eighth embodiment is a modification of the first or second embodiment and includes a first diffraction grating 50 provided in a portion closer to the optical modulator 2 than the phase adjusting unit 4 and the optical amplification unit 5 in the path of the optical waveguide 3. The first diffraction grating 50 reflects a part of light having a wavelength of light input to the optical modulator 2. According to an example, a second diffraction grating 52 may be provided in addition to the first diffraction grating 50. The second diffraction grating 52 is provided closer to the end portion of the substrate than the phase adjusting unit 4 and the optical amplification unit 5 in the path of the optical waveguide 3. The second diffraction grating 52 reflects a part of light having the wavelength of the light input to the optical modulator 2.

A transmittance spectrum has a ripple that periodically fluctuates with respect to a frequency of light because of multiple reflection of the light that occurs between a diffraction grating 60 and the end face of the optical semiconductor device 1 or between the diffraction gratings 50 and 52. A minimum value or a maximum value of the transmittance spectrum and the wavelength of the light input to the optical modulator are matched by phase adjustment of the phase adjusting unit 4.

Here, the minimum value of the transmittance spectrum and the wavelength of the light input to the optical modulator are matched when a frequency response characteristic of the optical modulator 2 does not have a peak exceeding 3 dB across all frequencies compared with a DC component. On the other hand, the maximum value of the transmittance spectrum and the wavelength of the light input to the optical modulator are matched when the frequency response characteristic of the optical modulator 2 has a peak exceeding 3 dB in a high-frequency component, which is not 0 GHz, compared with the DC component.

With the optical semiconductor device according to the eighth embodiment, by artificially forming a reflection point of light in advance, an FSR (a resonance frequency interval) of a ripple that periodically fluctuates with respect to a frequency of light in the transmittance spectrum can be set to a desired value. This enables signal quality improvement of modulated light after being transmitted through a plurality of reflection points while reducing the influence of manufacturing variation of the optical semiconductor device 1. It is more excellent to provide diffraction gratings in two places from the viewpoint of controllability against the manufacturing variation. On the other hand, when a diffraction grating is provided in one place, although controllability is inferior, a device can be manufactured smaller. Both of a size and manufacturing variation resistance can be improved.

Ninth Embodiment

Figure 24:
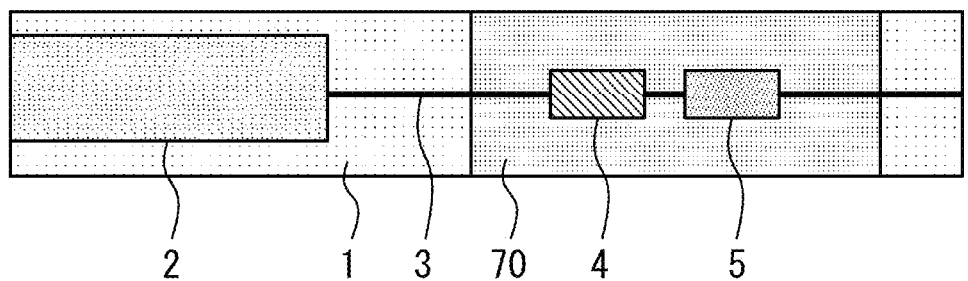
FIG. 24 is a diagram showing a configuration example of an optical semiconductor device.

FIG. 24 is a diagram showing a configuration example of an optical semiconductor device according to a ninth embodiment. The optical semiconductor device according to the ninth embodiment is a modification of the first or second embodiment and includes a refractive index modulation region 70 in a part of a substrate. The refractive index modulation region 70 is provided from a position between the optical modulator 2 and the phase adjusting unit 4 to the end face of the optical semiconductor device 1 or from the position between the optical modulator 2 and the phase adjusting unit 4 to a position between the optical amplification unit 5 and the end face of the optical semiconductor device 1. Since the refractive index modulation region 70 is provided, this region is different from other regions in an effective refractive index in a mode of light guided in the optical waveguide 3.

Since the refractive index modulation region 70 is provided, a first refractive index change section where an effective refractive index in a mode of guided light changes is generated in a portion closer to the optical modulator 2 than the phase adjusting unit 4 and the optical amplification unit 5 in the path of the optical waveguide 3. Further, when an end portion of the refractive index modulation region 70 is present between the optical amplification unit 5 and the end portion of the optical semiconductor device 1, a second refractive index change section where the effective refractive index in the mode of the guided light changes is generated closer to the end portion of the substrate than the phase adjusting unit 4 and the optical amplification unit 5 in the path of the optical waveguide.

A ripple that periodically fluctuates with respect to the frequency of light occurs in the transmittance spectrum because of multiple reflection of the light that occurs at the interface between the refractive index modulation region 70 and a region other than the refractive index modulation region 70. A minimum value or a maximum value of the transmittance spectrum coincides with the wavelength of light input to the optical modulator 2 by adjusting the phase adjustment amount of the phase adjusting unit 4.

Here, the minimum value of the transmittance spectrum and the wavelength of the light input to the optical modulator 2 are matched when the frequency response characteristic of the optical modulator does not have a peak exceeding 3 dB across all frequencies compared with a DC component. On the other hand, the maximum value of the transmittance spectrum and the wavelength of the light input to the optical modulator 2 are matched when the frequency response characteristic of the optical modulator has a peak exceeding 3 dB in a high-frequency component, which is not 0 GHz, compared with the DC component.

As a specific structure of the refractive index modulation region 70 formed in a waveguide structure in which an effective refractive index in a mode of light guided in the optical waveguide 3 is different from effective refractive indexes of other waveguide structures, various structures can be considered such as a structure in which an air gap is formed right under an optical waveguide, a structure filled with a material having a different refractive index such as a BCB as a clad of an optical waveguide, and a structure for slightly changing width while keeping equal a center position of a core layer in which light is mainly confined in the optical waveguide 3.

With the optical semiconductor device according to the ninth embodiment, as in the eighth embodiment, by artificially forming a reflection point of light in advance, an FSR of a ripple that periodically fluctuates with respect to a frequency of the light in the transmittance spectrum can be set to a desired value. This enables signal quality improvement of modulated light after being transmitted through a plurality of reflection points while reducing the influence of manufacturing variation of the optical semiconductor device 1. It is more excellent to provide the refractive index modulation region 70 from a position between the optical modulator 2 and the phase adjusting unit 4 to a position between the optical amplification unit 5 and the end face of the optical semiconductor device 1 from the viewpoint of controllability against the manufacturing variation. On the other hand, when the refractive index modulation region 70 is provided from the position between the optical modulator 2 and the phase adjusting unit 4 to the end face of the optical semiconductor device 1, although controllability is inferior, a device can be manufactured smaller. Therefore, both of a size and manufacturing variation resistance can be improved.

REFERENCE SIGNS LIST

2 optical modulator, 3 optical waveguide, 4 phase adjusting unit, 5 optical amplification unit, 31 first interface, 32 second interface

The invention claimed is:

1. An optical semiconductor device comprising:
a substrate;
an optical modulator provided on the substrate;
an optical waveguide provided on the substrate, one end of the optical waveguide being connected to a light emission side of the optical modulator and another end of the optical waveguide being present at an end portion of the substrate;
a phase adjusting unit provided on a path of the optical waveguide and configured to adjust a phase of light guided in the optical waveguide; and
an optical amplification unit provided on the path of the optical waveguide and configured to amplify power of the light guided in the optical waveguide, wherein
a minimum value or a maximum value of a transmittance spectrum having a ripple that periodically fluctuates with respect to a frequency because of multiple reflection of the light that occurs between the one end and the other end of the optical waveguide is matched with a wavelength of the light input to the optical modulator by phase adjustment of the phase adjusting unit, and an error vector amplitude is minimized.

2. The optical semiconductor device according to claim 1, wherein
a frequency response characteristic of the optical modulator does not have a peak exceeding 3 dB across all frequencies compared with a DC component, and
the minimum value and the wavelength of the light input to the optical modulator are matched by the phase adjustment of the phase adjusting unit.

3. The optical semiconductor device according to claim 1, wherein
a frequency response characteristic of the optical modulator has a peak exceeding 3 dB in a high-frequency component, which is not 0 GHz, compared with a DC component, and
the maximum value and the wavelength of the light input to the optical modulator are matched by the phase adjustment of the phase adjusting unit.

4. The optical semiconductor device according to claim 1, further comprising a light dividing unit, wherein
a plurality of unit structures each including the optical modulator, the optical waveguide, the phase adjusting unit, and the optical amplification unit are provided in parallel,
light divided by the light dividing unit is input to the plurality of unit structures, and
the phase adjusting unit belonging to each of the plurality of unit structures independently performs the phase adjustment.

5. The optical semiconductor device according to claim 2, wherein a distance from the one end to the other end of the optical waveguide is set such that a resonance frequency interval of the ripple of the transmittance spectrum substantially coincides with 0.5 times to 1.25 times of a modulation baud rate of a communication signal input to the optical modulator.

6. The optical semiconductor device according to claim 3, wherein
the frequency response characteristic of the optical modulator has a peak exceeding 3 dB in a frequency component substantially coinciding with 0.5 times to 1.25 times of a modulation baud rate of a communication signal compared with the DC component, and
a distance from the one end to the other end of the optical waveguide is set such that a resonance frequency interval of the ripple of the transmittance spectrum substantially coincides with 0.5 times to 1.25 times of the modulation baud rate of the communication signal input to the optical modulator.

7. An optical control apparatus comprising:
the optical semiconductor device according to claim 2;
a beam splitter configured to divide a part of power of modulated light emitted from the other end of the optical waveguide to an outside of the optical semiconductor device;
a light receiving unit configured to convert the light divided by the beam splitter into a light receiving current corresponding to optical power; and
a control unit configured to detect the light receiving current and output a phase adjustment signal toward the phase adjusting unit, wherein
the control unit applies, as the phase adjustment signal, in addition to a phase adjustment amount which is a DC component, a dither signal having an amplitude of approximately 1/10 of the phase adjustment amount and having a low-speed frequency at which the light receiving unit can respond, and determines a value of the DC component of the phase adjustment signal such that an AC component and a DC component of the light receiving current are smallest.

8. An optical control apparatus comprising:
the optical semiconductor device according to claim 3;
a beam splitter configured to divide a part of power of modulated light emitted from the other end of the optical waveguide to an outside of the optical semiconductor device;
a light receiving unit configured to convert the light divided by the beam splitter into a light receiving current corresponding to optical power; and
a control unit configured to detect the light receiving current and output a phase adjustment signal toward the phase adjusting unit, wherein
the control unit applies, as the phase adjustment signal, in addition to a phase adjustment amount which is a DC component, a dither signal having an amplitude of approximately 1/10 of the phase adjustment amount and having a low-speed frequency at which the light receiving unit can respond, and determines a value of the DC component of the phase adjustment signal such that an AC component of the light receiving current is smallest and a DC component of the light receiving current is largest.

9. An optical control apparatus comprising:
a first unit structure and a second unit structure provided by arranging, in parallel, two unit structures each including the optical modulator, the optical waveguide, the phase adjusting unit, and the optical amplification unit according to claim 1;
a light dividing unit configured to equally divide power of light into two, make one light incident on the optical modulator of the first unit structure, and make other light incident on the optical modulator of the second unit structure;
a polarized wave rotation multiplexer configured to rotate a polarized wave of one of first modulated light emitted from the first unit structure and second modulated light emitted from the second unit structure, not to rotate a polarized wave of other of the of first modulated light and the second modulated light, and multiplex the polarized waves;

a beam splitter configured to divide a part of power of modulated light polarization-multiplexed by the polarized wave rotation multiplexer;

a light receiving unit configured to convert the light divided by the beam splitter into a light receiving current corresponding to optical power; and a control unit configured to detect the light receiving current and output two phase adjustment signals toward the phase adjusting unit of the first unit structure and the phase adjusting unit of the second unit structure, wherein the control unit applies, as the two phase adjustment signals, in addition to phase adjustment amounts which are DC components, dither signals having amplitudes of approximately $1/10$ of the phase adjustment amounts and having low-speed frequencies at which the light receiving unit can respond, the low-speed frequencies being different two frequencies separated to an electrically separable degree, and determines values of the DC components of the two phase adjustment signals such that AC components of different two frequencies of the light receiving current are smallest and DC components of the two frequencies are largest or smallest, when a frequency response characteristic of the optical modulator does not have a peak exceeding 3 dB across all frequencies compared with a DC component, the control unit adjusts the DC components of the light receiving current to the smallest, and when the frequency response characteristic of the optical modulator has a peak exceeding 3 dB in a high-frequency component, which is not 0 GHz, compared with the DC component, the control unit adjusts the DC components of the light receiving current to the largest.

10. The optical semiconductor device according to claim 2, further comprising a first diffraction grating provided in a portion closer to the optical modulator than the phase adjusting unit and the optical amplification unit in the path of the optical waveguide.

11. The optical semiconductor device according to claim 10, further comprising a second diffraction grating provided closer to the end portion of the substrate than the phase adjusting unit and the optical amplification unit in the path of the optical waveguide.

12. The optical semiconductor device according to claim 2, wherein a first refractive index change section where an effective refractive index in a mode of guided light changes is provided in a portion closer to the optical modulator than the phase adjusting unit and the optical amplification unit in the path of the optical waveguide.

13. The optical semiconductor device according to claim 12, wherein a second refractive index change section where the effective refractive index in the mode of the guided light changes is provided closer to the end portion of the substrate than the phase adjusting unit and the optical amplification unit in the path of the optical waveguide.

14. The optical semiconductor device according to claim 3, further comprising a first diffraction grating provided in a portion closer to the optical modulator than the phase adjusting unit and the optical amplification unit in the path of the optical waveguide.

15. The optical semiconductor device according to claim 14, further comprising a second diffraction grating provided closer to the end portion of the substrate than the phase adjusting unit and the optical amplification unit in the path of the optical waveguide.

16. The optical semiconductor device according to claim 3, wherein a first refractive index change section where an effective refractive index in a mode of guided light changes is provided in a portion closer to the optical modulator than the phase adjusting unit and the optical amplification unit in the path of the optical waveguide.

17. The optical semiconductor device according to claim 16, wherein a second refractive index change section where the effective refractive index in the mode of the guided light changes is provided closer to the end portion of the substrate than the phase adjusting unit and the optical amplification unit in the path of the optical waveguide.

* * * * *